(12) United States Patent
Zamir et al.

(10) Patent No.: US 10,073,915 B1
(45) Date of Patent: *Sep. 11, 2018

(54) PERSONALIZED SEARCH RESULTS

(71) Applicant: Google Inc., Mountain View, CA (US)

(72) Inventors: Oren Zamir, Los Altos, CA (US);
Jeffrey Korn, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,873

(22) Filed: Apr. 1, 2016

Related U.S. Application Data

(63) Continuation of application No. 11/565,300, filed on Nov. 30, 2006, now Pat. No. 9,305,088.

(51) Int. Cl.
*G06F 17/30* (2006.01)
*G06F 7/00* (2006.01)

(52) U.S. Cl.
CPC .. *G06F 17/30867* (2013.01); *G06F 17/30528* (2013.01); *G06F 17/30598* (2013.01); *G06F 17/30604* (2013.01)

(58) Field of Classification Search
CPC ....... G06F 17/130011; G06F 17/30867; G06F 17/30864
USPC .......................................................... 707/769
See application file for complete search history.

(56) References Cited

U.S. PATENT DOCUMENTS

| | | | |
|---|---|---|---|
| 7,594,189 B1 * | 9/2009 | Walker | G06Q 30/02 715/811 |
| 8,832,055 B1 | 9/2014 | Zwicky et al. | |
| 2003/0028512 A1 * | 2/2003 | Stensmo | G06F 17/30687 |
| 2003/0120654 A1 | 6/2003 | Edlund et al. | |
| 2004/0249801 A1 * | 12/2004 | Kapur | G06F 17/30864 |
| 2005/0160107 A1 * | 7/2005 | Liang | G06F 17/30109 |
| 2005/0210008 A1 * | 9/2005 | Tran | G06F 17/30864 |
| 2006/0010105 A1 * | 1/2006 | Sarukkai | G06F 17/30648 |
| 2006/0029368 A1 * | 2/2006 | Harville | H04N 5/76 386/230 |
| 2006/0106793 A1 | 5/2006 | Liang | |
| 2007/0005568 A1 * | 1/2007 | Angelo | G06F 17/30864 |
| 2007/0038615 A1 | 2/2007 | Vadon et al. | |
| 2007/0208730 A1 * | 9/2007 | Agichtein | G06F 17/30867 |
| 2007/0244902 A1 | 10/2007 | Seide et al. | |
| 2007/0255702 A1 * | 11/2007 | Orme | G06F 17/30696 |

* cited by examiner

*Primary Examiner* — Kuen S Lu
(74) *Attorney, Agent, or Firm* — Middleton Reutlinger

(57) ABSTRACT

A system tracks a user's search related behavior and constructs a probability model, from the user's search related behavior, to estimate a probability that the user will select a certain type of search result. The system searches sources of information based on a search query received from the user to determine a set of search results and uses the estimated probabilities to select one or more search results from the set of search results.

14 Claims, 11 Drawing Sheets

PERSONALIZED SEARCH RESULTS

BACKGROUND

Implementations described herein relate generally to document searching and, more particularly, to personalizing the types of search results provided to a searching entity.

DESCRIPTION OF RELATED ART

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

Generally, search engines may base their determination of the user's interest on search terms (called a search query) entered by the user. The goal of the search engine is to identify links to high quality, relevant results (e.g., web pages) based on the search query. Typically, the search engine accomplishes this by matching the terms in the search query to a corpus of pre-stored documents. Documents that contain the user's search terms are considered "hits" and are returned to the user. The "hits" returned by the search engine may be ranked among one another by the search engine based on some measure of the quality and/or relevancy of the hits. A basic technique for sorting the search hits relies on the degree with which the search query matches the hits. For example, documents that contain every term of the search query or that contain multiple occurrences of the terms in the search query may be deemed more relevant than documents that contain less than every term of the search query or a single occurrence of a term in the search query and, therefore, may be more highly ranked by the search engine.

SUMMARY

According to one aspect, a method may include receiving a search query and searching a corpus of documents, or information associated with the corpus of documents, based on the search query to obtain a set of search results. The method may further include searching sources of specialized information, or information associated with the sources of specialized information, based on the search query to obtain specialized results and providing the set of search results and the specialized results to a user. The method may also include tracking parameters associated with the user's selection of results from the specialized results and constructing a probability model, based on the tracked parameters, to estimate one or more probabilities that the user will select a certain type of the specialized results for use in selecting or scoring future search results provided to the user.

According to another aspect, a method may include searching a corpus of documents, or information associated with the corpus of documents, based on a search query to obtain a set of search results and searching sources of specialized information, or information associated with the sources of specialized information, to obtain a set of specialized results. The method may further include obtaining one or more probability estimates that a user will select certain types of results of the specialized results based on the user's search related behavior and scoring or selecting one or more specialized results from the set of specialized results based on the one or more probability estimates.

According to a further aspect, a method may include tracking a user's search related behavior and constructing a probability model, from the user's search related behavior, to estimate a probability that the user will select a certain type of search result. The method may further include searching sources of information based on a search query received from the user to determine a set of search results and using the estimated probability to select one or more search results from the set of search results.

According to an additional aspect, a method may include searching a corpus of documents, or information associated with the corpus of documents, based on a search query to obtain a set of search results. The method may further include searching sources of specialized information, or information associated with the sources of specialized information, to obtain a set of specialized results. The method may also include estimating one or more probabilities that a user will select certain types of results of the specialized results based on the user's search related behavior and selectively providing certain types of the specialized results to the user based on the estimated one or more probabilities.

BRIEF DESCRIPTION OF THE DRAWINGS

The accompanying drawings, which are incorporated in and constitute a part of this specification, illustrate one or more embodiments of the invention and, together with the description, explain aspects of the invention. In the drawings.

DETAILED DESCRIPTION

Figure 1:
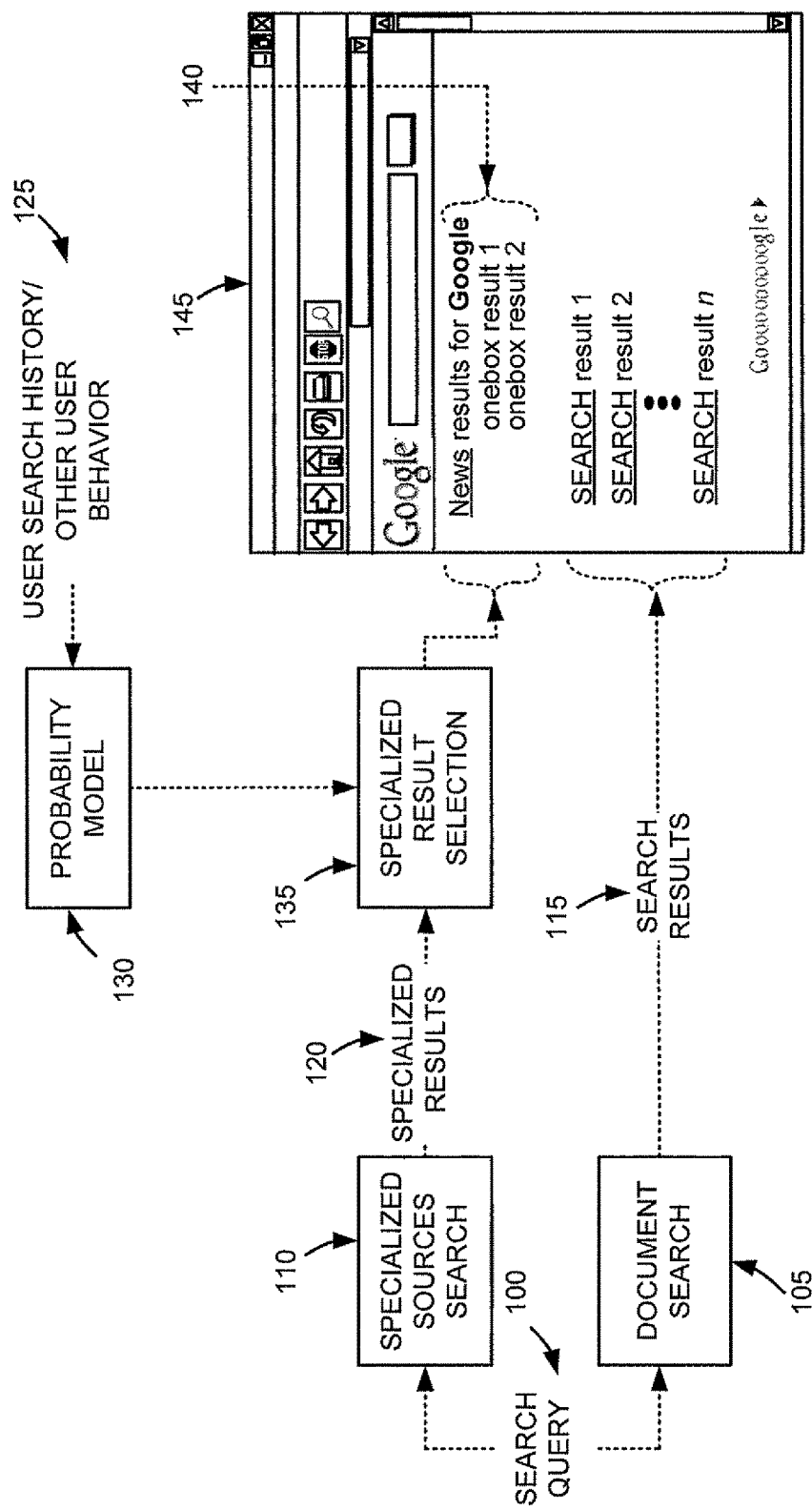
FIG. 1 is an exemplary diagram of an overview of an implementation described herein.

The following detailed description of the invention refers to the accompanying drawings. The same reference numbers in different drawings may identify the same or similar elements. Also, the following detailed description does not limit the invention.

A technique for providing search results to a searching entity, as described herein, includes, in addition to searching a corpus of documents using existing techniques, searching sources of specialized information. Different types of specialized information searched may include, for example, news, stock quotes, weather, music, movies, travel, maps, images, shopping, search history, word definitions, questions, patents, local time information, discussion groups, blogs, and television listings. News sources may be searched to return news items related to a search query issued by the searching entity. Stock quotes may be searched to return live quotes from financial sites (e.g., Google Finance, Yahoo Finance, etc.). Weather sources may return a weather forecast for a location corresponding to the issued search query. Music sources may include information regarding artists, bands, albums or reviews corresponding to the issued search query. Movie sources may provide movie show times for theaters near the searching entity. Travel sources may provide travel conditions (e.g., flight status) at a location corresponding to the issued search query. Map sources may provide geographic maps of a location contained in the issued search query. Image sources may provide image files corresponding to the issued search query. Shopping sources may provide information related to products (e.g., Google Froogle). Search history may provide documents (e.g., web pages) relevant to the issued query that the searching entity has already visited. Definition sources may provide a definition of a word(s) contained in the issued search query. Question answering sources may provide the answers to simple factual questions. Patent sources may provide patent information corresponding to patent numbers contained in the issued search query. Local time sources may provide a current local time for a location contained in the issued search query. The above types of specialized information may be provided at a highlighted or prominent position on a search result document provided to the searching entity that additionally includes other search results. For example, the above types of specialized information may be provided at the top of a search result document that includes other search results.

As described herein, a technique for personalizing the types of specialized information provided to a given user may include the use of a probability model that takes into account the user's recent search history and other search related behavior. Probability modeling techniques can be used to construct a model that estimates probabilities that a user will select a given type of specialized information from a set of search results. The probability model may be constructed based on the given user's number of past selections of each type of specialized information source. The probability model may further be constructed based on other parameters, such as, for example, a number of search queries per selections for a given specialized information source, a number of days of search queries per selections for a given specialized information source, an average search query length, an average number of search queries per month, a percentage of weekend traffic, etc.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. A document may include any type of content including, for example, content from the specialized sources of information described above. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

Overview

FIG. 1 illustrates an exemplary overview of an implementation described herein. As shown, a search query 100 may be received by a search engine (not shown) from a user. The search engine, using search query 100, performs a document search 105 and a specialized sources search 110. Document search 105 may search a corpus of documents (e.g., web pages), or information associated with the corpus of documents, stored in a repository of documents crawled by a data aggregation service. Specialized sources search 110 may search sources that store specialized types of information, such as, for example, information related to one or more of news, stock quotes, weather, music, movies, travel, maps, images, shopping, search history, definitions, questions, patents, a local time, discussion groups, blogs, and television listings. Specialized sources search 110 may search the corpus of documents searched by document search 105, with certain documents of the corpus of documents being identified as "specialized sources." In one implementation, the corpus of documents searched by document search 105 may be indexed separately from documents searched by specialized sources search 110. For example, a corpus of documents representing web pages throughout the Internet may be indexed separately from information from documents related to news, stock quotes, weather, music, movies, travel, maps, images, shopping, search history, definitions, questions, patents, a local time, discussion groups, blogs, and television listings. Thus, in this implementation, specialized sources search 110 may search a different index associated with each of the different types of specialized information (e.g., news, stock quotes, weather, music, movies, travel, maps, images, shopping, search history, definitions, questions, patents, a local time, discussion groups, blogs, and television listings), while document search 105 may search an index associated with a general corpus of documents (e.g., representing web pages throughout the Internet).

Document search 105 may return a set of search results 115 and specialized sources search 110 may return a set of specialized results 120. Search history and/or other search related user behavior 125 associated with the user that issued search query 100 may be used to build a probability model 130. Probability model 130 may be built using existing statistical techniques, such as, for example, logistic regression, regression trees, or other existing statistical modeling techniques. Probability model 130 may estimate one or more probabilities that the user will select certain types of results from specialized results 120. For example, probability model 130 may estimate the probabilities that the user will select one or more of news results, stock quote results, weather results, music results, movie results, travel results, map results, image results, shopping results, search history results, word definition results, patent results, or local time results.

Using estimated probabilities obtained from probability model 130, the search engine may select certain ones of specialized results 120 to perform specialized result selection 135. Thus, those types of specialized results with the highest estimated probabilities may be selected from specialized results 120. Search results 115 and the selected specialized results 140, or links to search results 115 and specialized results 140, may then be included in a search result document 145, with the selected specialized results 140 being placed at a highlighted or prominent position relative to search results 115. Search result document 145 may be returned to the user that issued search query 100.

Exemplary Network Configuration

Figure 2:
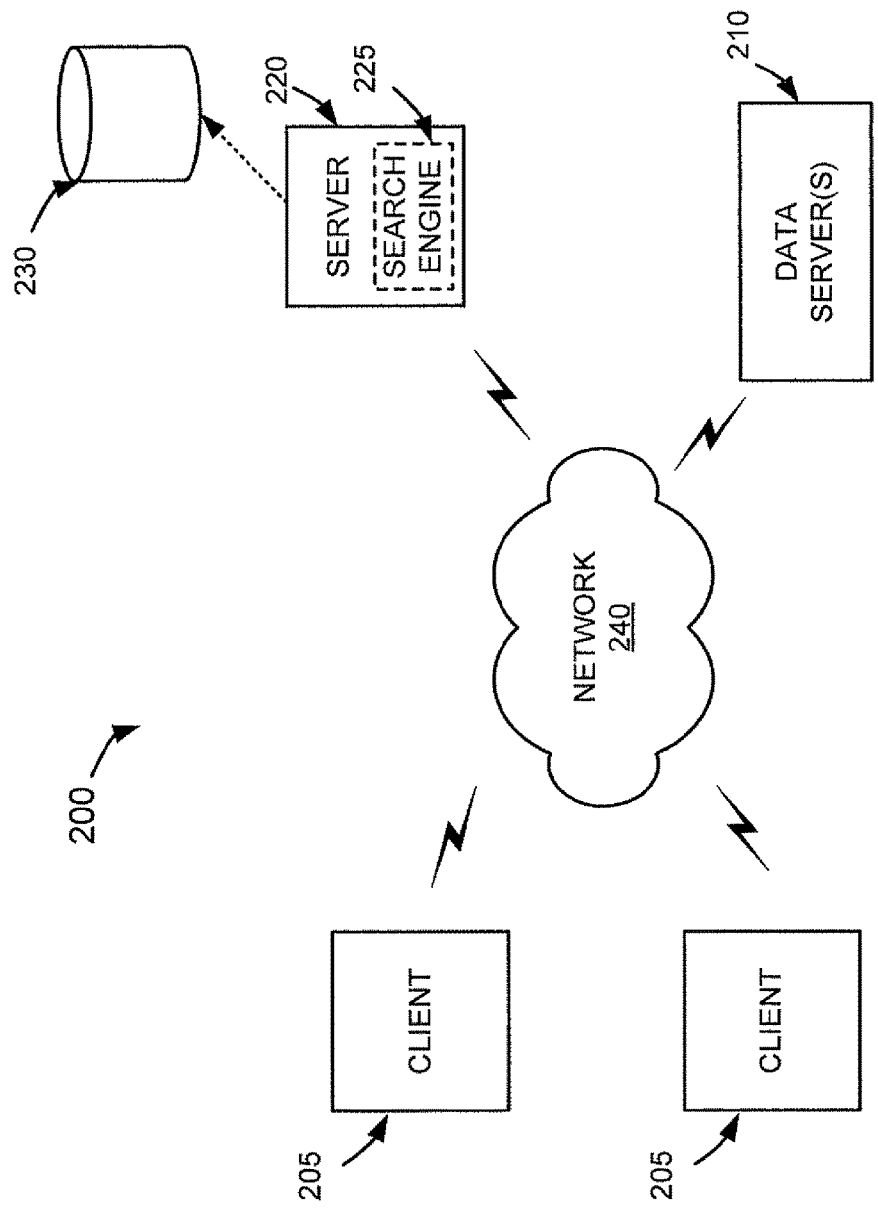
FIG. 2 is an exemplary diagram of a network in which systems and methods described herein may be implemented.

FIG. 2 is an exemplary diagram of a network 200 in which systems and methods described herein may be implemented. Network 200 may include multiple clients 205 connected to one or more servers 210 or 220 via a network 240. Two clients 205 and servers 210 and 220 have been illustrated as connected to network 240 for simplicity. In practice, there may be more or fewer clients and servers. Also, in some instances, a client may perform one or more functions of a server and a server may perform one or more functions of a client.

Clients 205 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Clients 205 may implement a browser for browsing documents stored at servers 210 or 220.

Server 220 may include a server entity that accesses, fetches, aggregates, processes, searches, and/or maintains documents. Server 220 may implement a data aggregation service by crawling a corpus of documents (e.g., web pages) hosted on data server(s) 210, indexing the documents, and storing information associated with these documents in a repository of crawled documents. The aggregation service may be implemented in other ways, such as by agreement with the operator(s) of data server(s) 210 to distribute their documents via the data aggregation service. The corpus of documents crawled by server 220 may include sources of different types of specialized information, such as, for example, news, stock quotes, weather, music, movies, travel, maps, images, shopping, search history, word definitions, questions, patents, local time, discussion groups, blogs, and television listings. The data aggregation service may index documents, associated with the different types of specialized information, in different and separate indexes so that each of the indexes may be searched independently of the other indexes. For example, documents related to specialized information such as news may be indexed and searched separately from documents related to specialized information such as weather. Each type of specialized information may, for example, constitute a different "corpora" for searching.

In accordance with one implementation, server 220 may include a search engine 225 usable by users at clients 205. Search engine 225 may execute a search using a search query, received from a user at a client 205, on the corpus of documents stored in the repository of crawled documents. The search executed by search engine 225 may include a search of the previously crawled specialized sources of information. Server 220 may provide, to a user issuing a query, a list of documents related to the issued query. Server 220 may also track and store search result selection activity, or other search related activity, of users at clients 205 in a database 230. The stored search result selection activity may be indexed in database 230, for example, by an identifier associated with the user who performed the search result selection activity, thus, permitting subsequent retrieval of search result selection activity on a user basis. The user identifier may include account identification information (e.g., Google accounts), a cookie, or an Internet Protocol (IP) address associated with the user. Search result selection activity may also be retrieved by country, user-agent, etc. The stored search result selection activity of a given user may be subsequently retrieved for use in building a probability model that estimates probabilities that a given user will select results from the different types of specialized results.

Data server(s) 210 may store or maintain documents that may be crawled by server 220. Such documents may include data related to published news stories, products, images, user groups, geographic areas, or any other type of data. For example, server(s) 210 may store or maintain news stories from any type of news source, such as, for example, the Washington Post, the New York Times, Time magazine, or Newsweek. As another example, server(s) 210 may store or maintain data related to specific products, such as product data provided by one or more product manufacturers. As yet another example, server(s) 210 may store or maintain data related to other types of web documents, such as pages of web sites.

While servers 210 and 220 are shown as separate entities, it may be possible for one of servers 210 or 220 to perform one or more of the functions of the other one of servers 210 or 220. For example, it may be possible that servers 210 and 220 are implemented as a single server. It may also be possible for a single one of servers 210 and 220 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network. Clients 205 and servers 210 and 220 may connect to network 240 via wired and/or wireless connections.

Exemplary Client/Server Architecture

Figure 3:
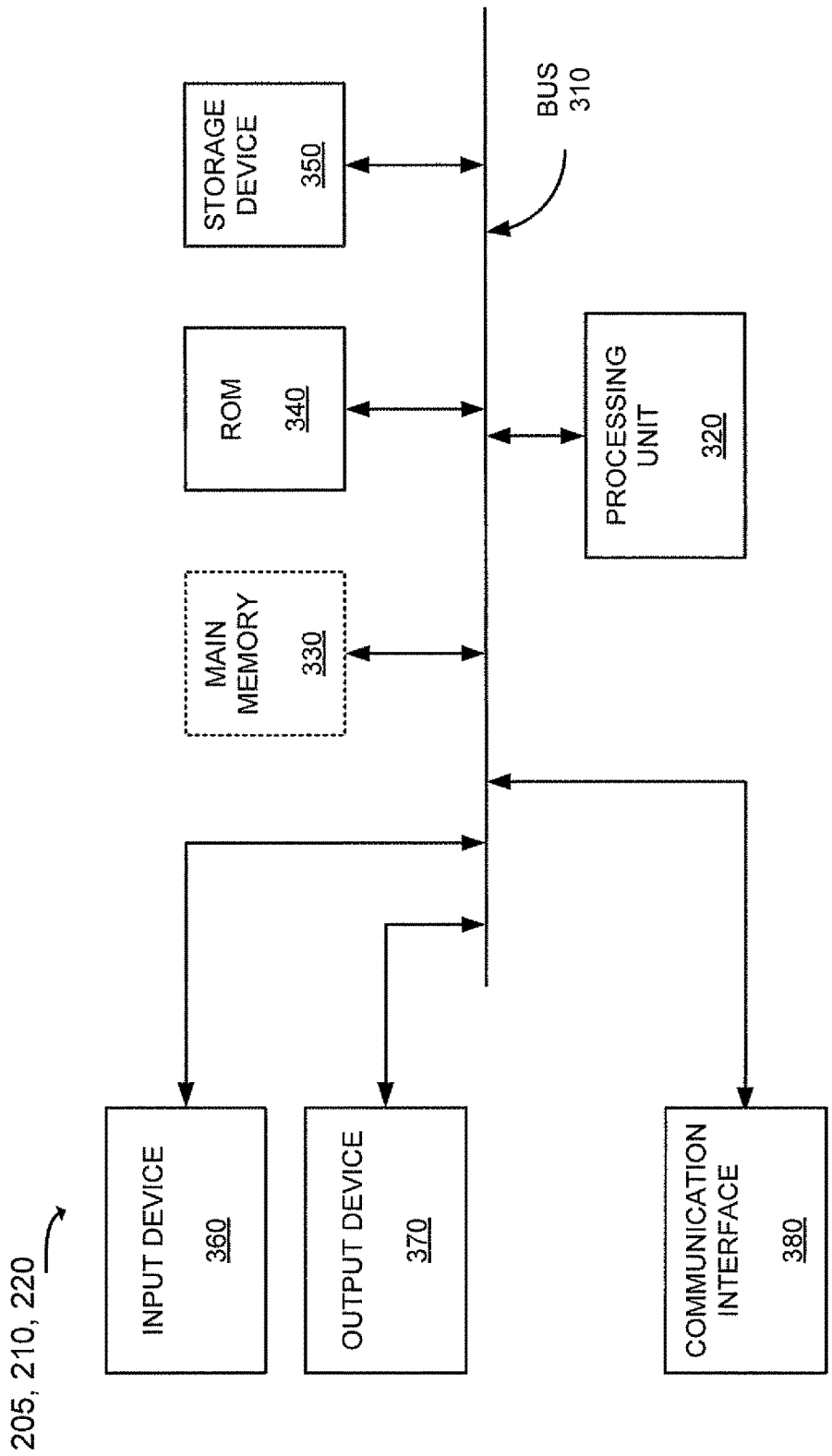
FIG. 3 is an exemplary diagram of a client or server of FIG. 2.

FIG. 3 is an exemplary diagram of a client or server entity (hereinafter called "client/server entity") which may correspond to one or more of clients 205 and/or servers 210 or 220. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes described herein. Thus, implementations described herein are not limited to any specific combination of hardware circuitry and software.

Exemplary Process for Building a Probability Model

Figure 4:
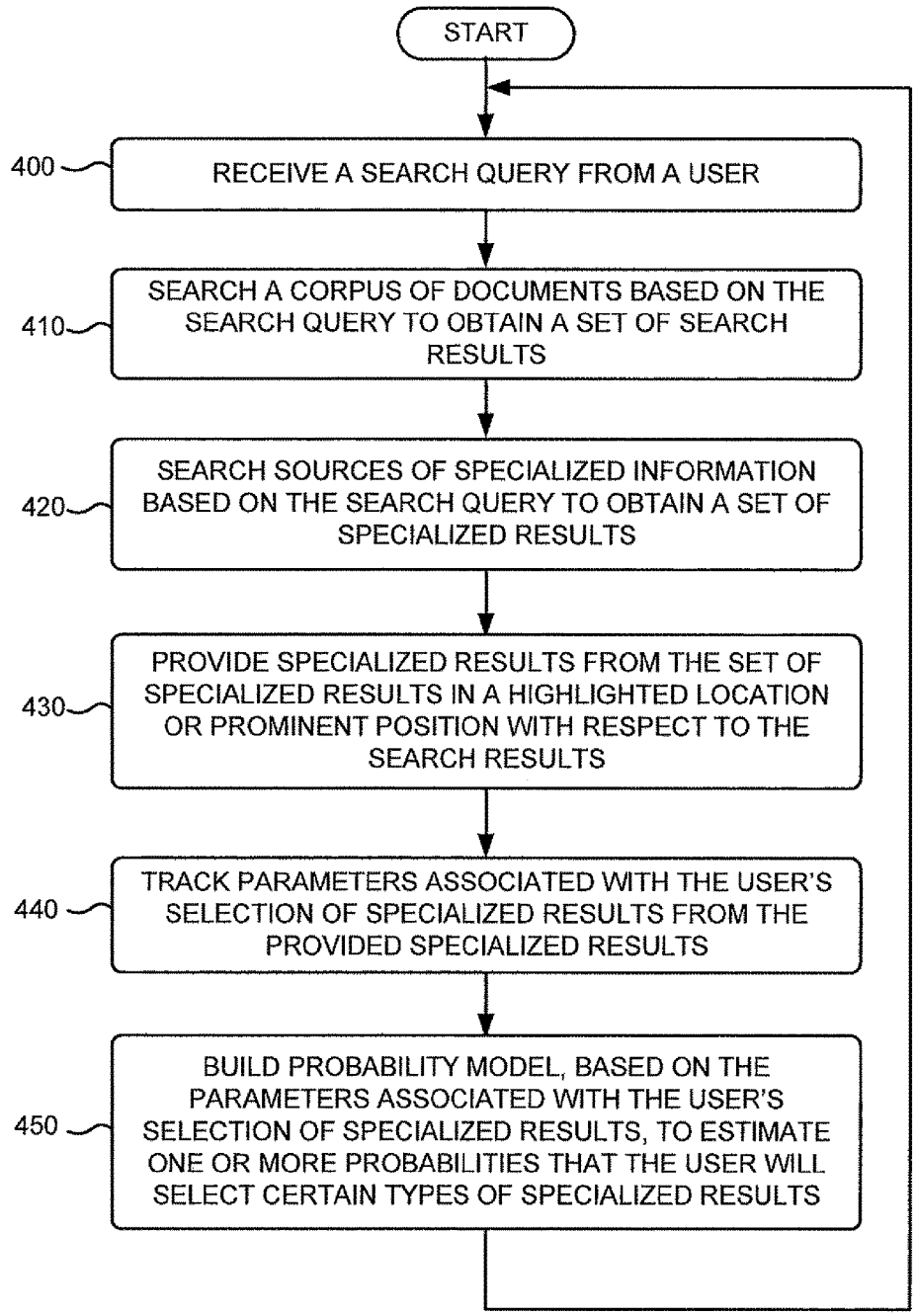
FIG. 4 is a flowchart of an exemplary process for building a probability model to estimate probabilities that a given user will select certain types of search results.

FIG. 4 is a flowchart of an exemplary process for building a probability model that estimates probabilities that a user will select certain types of search results from a set of search results obtained from specialized sources of information. The process exemplified by FIG. 4 may be performed by, for example, search engine 225 of server 220.

Figure 5:
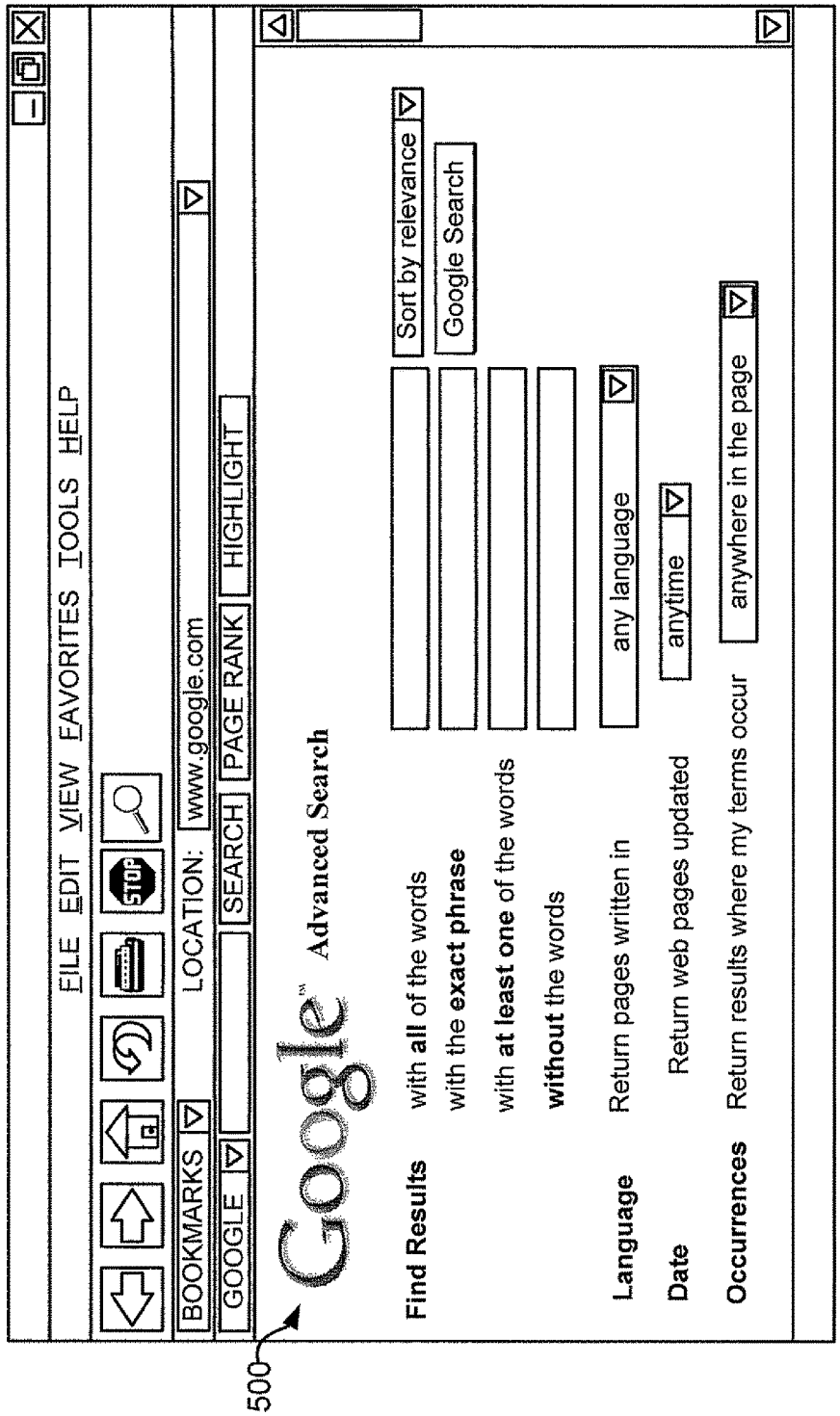
FIG. 5 is a diagram of an exemplary document for user entry of a search query.
Figure 6:
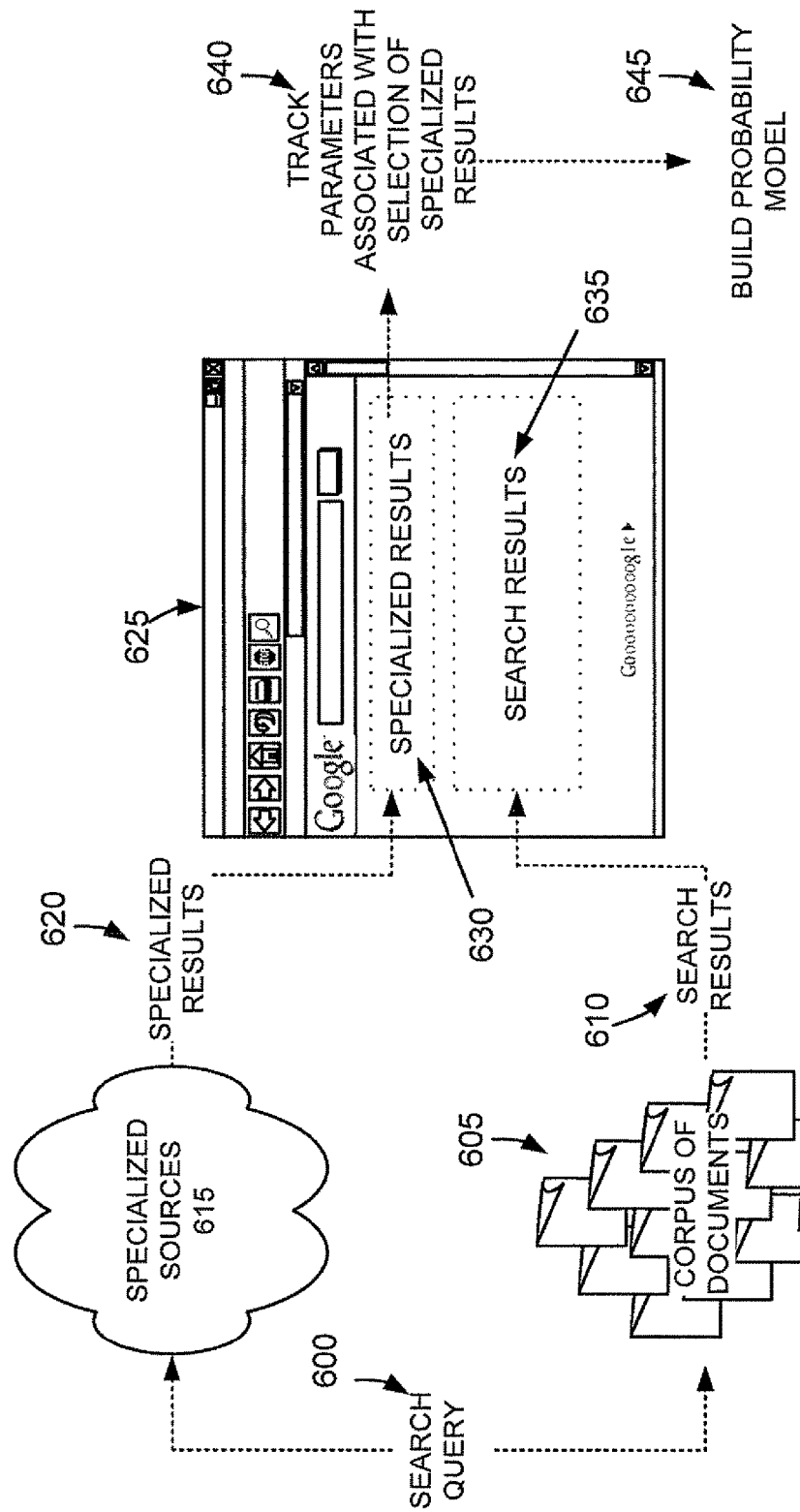
FIG. 6 is a diagram that graphically illustrates the exemplary process of FIG. 4.

The exemplary process may begin with the receipt of a search query from a user (block 400). The search query may include, for example, one or more keywords. FIG. 5 depicts one example of a user interface 500 that a user may use to enter a search query that may be provided to search engine 225 of server 220. The user may enter the search query via user interface 500 at a client 205, and client 205 may transmit the search query to search engine 225 via network 240. A corpus of documents may be searched based on the search query to obtain a set of search results (block 410). Search engine 225 may search the repository of crawled documents to obtain search results that match the search query (e.g., search results that are relevant to the search query). As shown in FIG. 6, a search query 600 may be used to search a corpus of documents 605 to obtain a set of search results 610.

Sources of specialized information may also be searched based on the search query to obtain a set of specialized results (block 420). The sources of specialized information may include, for example, sources (e.g., websites) that store information related to one of news, stock quotes, weather, music, movies, travel, maps, images, shopping, search history, definitions, questions, patents, a local time, discussion groups, blogs, or television listings. In one implementation, the sources of specialized information may be indexed separately from the corpus of documents searched in block 410 above, thus, permitting an independent search of each index associated with a specialized type of information. The specialized results may include documents or information obtained from the sources of specialized information that match (e.g., is relevant to) the search query. As depicted in FIG. 6, search query 600 may be used to search specialized sources 615 to obtain a set of specialized results 620.

Specialized results from the set of specialized results may be provided in a highlighted location or prominent position with respect to the search results in a search result document (block 430). For example, the specialized results may be placed first, at a highlighted location, relative to the search results on the search document. The search result document may be provided by server 220 to a respective client 205 via network 240. As illustrated in FIG. 6, specialized results 620 may be provided at a prominent location 630 in search result document 625 with respect to a location 635 of search results 610.

Parameters associated with the user's selection of specialized results from the provided specialized results may be tracked (block 440). The user that issued the search query may browse the search result document at a respective client 205 and may select (e.g., "click" on) one or more results from the specialized results. The tracked parameters may be accumulated and subsequently used in building or training a probability model (described below). FIG. 6 illustrates the tracking 640 of the parameters associated with user selection of specialized results 620 from search result document 625.

A probability model may be built, based on the parameters associated with the user's selection of specialized results, to estimate one or more probabilities that the user will select certain types of specialized results in the future (block 450). The probability may be built based on, for example, one or more of the following parameters:

a) a number of past selections of a type of the specialized sources of information;

b) a number of search queries per selection of a certain type of the specialized sources of information;

c) a number of days of search queries per selection of a certain type of the specialized sources of information;

d) an average search query length;

e) an average number of search queries per month;

f) a percentage of selections of the specialized sources of information that occur on weekends; or g) a percentage of selections of the specialized sources of information that occur on weekdays.

The probability model may be built or trained using existing statistical techniques, such as, for example, logistic regression, regression trees, or other existing statistical modeling techniques. The probability model may estimate one or more probabilities that the user will select certain types of results from the specialized results. For example, the probability model may estimate a probability that the user will select news results, stock quote results, weather results, music results, movie results, travel results, map results, image results, shopping results, search history results, word definition results, patent results, local time results, discussion group results, blog results, and/or television listing results from the specialized results. The probability model may also aggregate user behavior associated with multiple different users to estimate probabilities that a given user will select certain types of results from the specialized results. FIG. 6 depicts the building 645 of the probability model based on tracked parameters 640 associated with selection of specialized results 620 from search result document 625.

Exemplary Search Result Selection/Scoring Process

Figure 7:
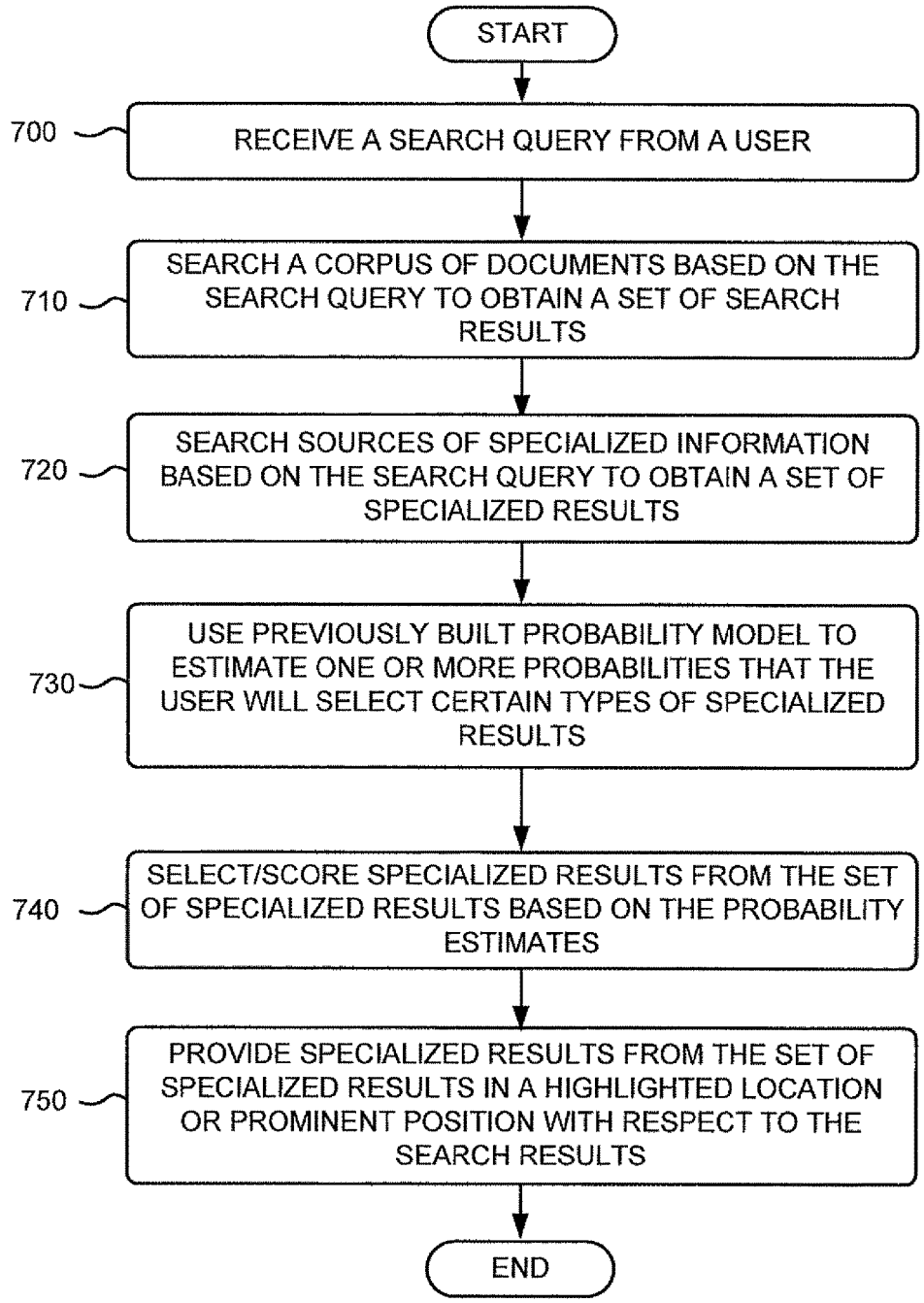
FIG. 7 is a flowchart of an exemplary process for selecting and/or scoring search results using the probability model built in the exemplary process of FIG. 4.

FIG. 7 is a flowchart of an exemplary process for using probability estimates obtained from the probability model built in the exemplary process of FIG. 4 to select and/or score specialized results that are to be provided to a user. The process exemplified by FIG. 7 may be performed by search engine 225 of server 220.

Figure 8:
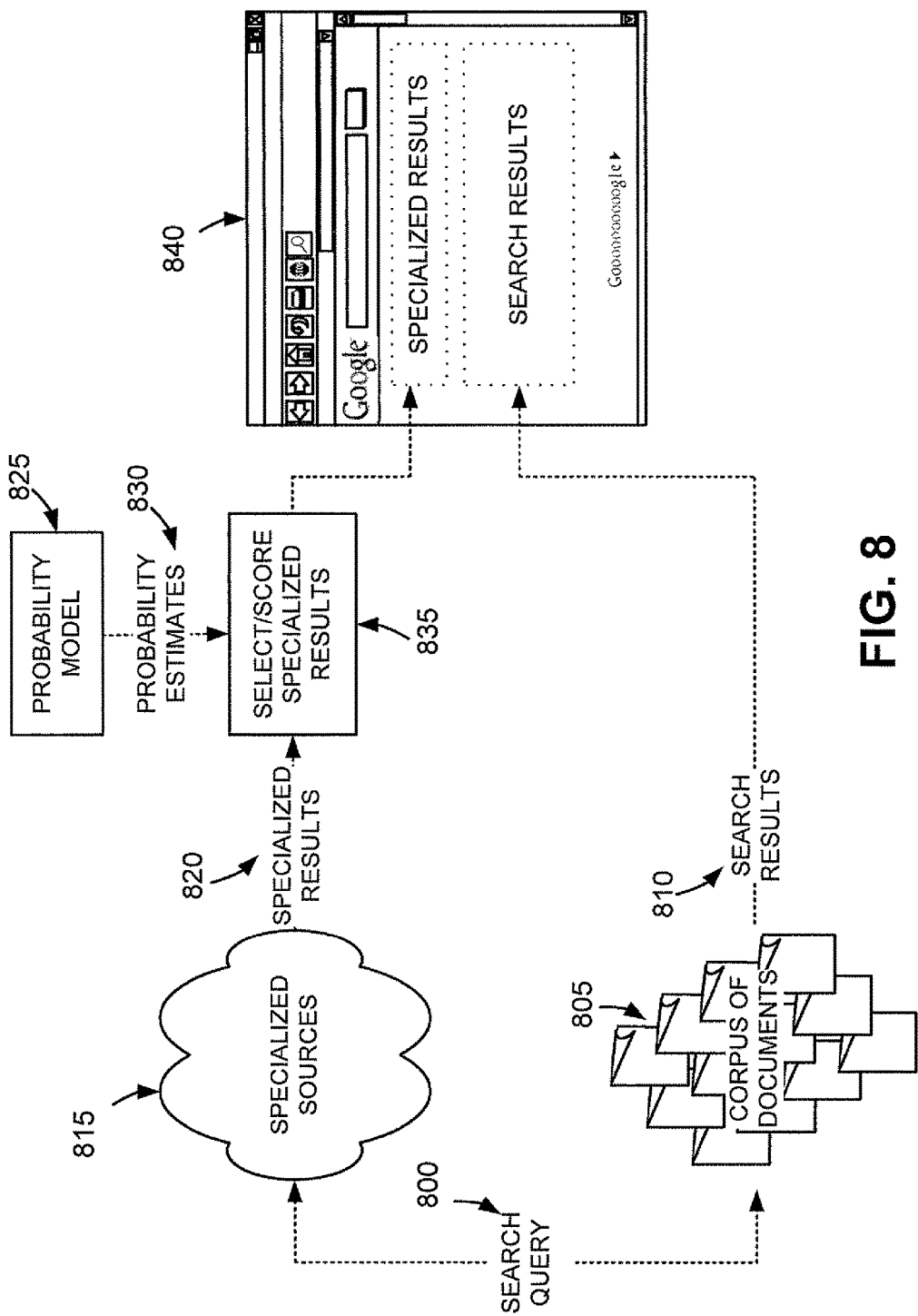
FIG. 8 is a diagram that graphically illustrates the exemplary process of FIG. 7.

The exemplary process may begin with the receipt of a search query from a user (block 700). The search query may include, for example, one or more keywords. The search query may be provided by a user via, for example, the exemplary user interface 500 described above with respect to FIG. 5. The user may enter the search query via user interface 500 at a client 205, and client 205 may transmit the search query to search engine 225 via network 240. A corpus of documents may be searched based on the search query to obtain a set of search results (block 710). Search engine 225 may search the repository of crawled documents to obtain search results that match the search query (e.g., search for results that are relevant to the search query). As illustrated in FIG. 8, a search query 800 may be used to search a corpus of documents 805 to obtain a set of search results 810.

Sources of specialized information may also be searched based on the search query to obtain a set of specialized results (block 720). The sources of specialized information may include, for example, sources (e.g., websites) that store information related to news, stock quotes, weather, music, movies, travel, maps, images, shopping, search history, definitions, questions, patents, and/or a local time. In one implementation, the sources of specialized information may be indexed separately from the corpus of documents searched in block 710 above, thus, permitting an independent search of each index associated with a specialized type of information. The specialized results may include documents or information obtained from the sources of specialized information that match (e.g., is relevant to) the search query. As shown in FIG. 8, search query 800 may be used to search specialized sources 815 to obtain a set of specialized results 820.

The previously built probability model (described above with respect to FIG. 4) may be used to estimate one or more probabilities that the user will select certain types of specialized results (block 730). For example, the probability model may be used to estimate a probability that the user will select news results, stock quote results, weather results, music results, movie results, travel results, map results, image results, shopping results, search history results, word definition results, patent results, and/or local time results from the specialized results. As shown in FIG. 8, probability model 825 is used to provide probability estimates 830 for selection/scoring of specialized results 820.

Specialized results from the set of specialized results may be selected/scored based on the probability estimates (block 740). For example, the specialized results with the highest probability estimates (e.g., the top four specialized results with the highest probability estimates) may be selected. As another example, all specialized results having corresponding probability estimates higher than a pre-selected threshold (e.g., >0.7) may be selected. In addition, or alternatively, each specialized result may be assigned a score based on its corresponding probability estimate. Any scoring algorithm may be used for assigning a value to each specialized result based on its corresponding probability estimate. For example, a score may be assigned to a specialized result as a function (e.g., a linear function) of its corresponding probability estimate. Specialized results with higher probability estimates may, thus, be assigned higher scores than specialized results with lower probability estimates. The scores may then be used in ranking the specialized results among one another. For example, specialized results with higher assigned scores may be ranked higher than specialized results with lower assigned scores. FIG. 8 illustrates the selection/scoring 835 of specialized results 820 using probability estimates 830 provided by probability model 825.

Figure 9:
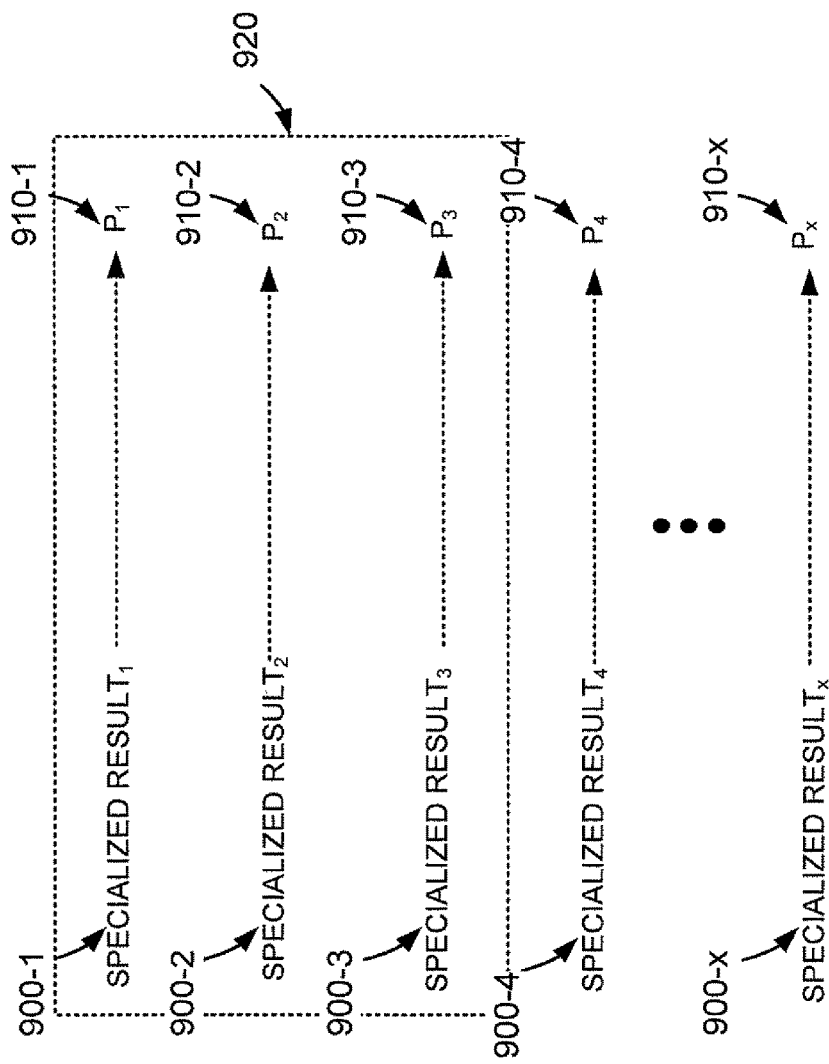
FIG. 9 is a diagram that graphically depicts the selection of search results using probability estimates obtained via the exemplary process of FIG. 7.

FIG. 9 illustrates one exemplary embodiment in which specialized results 900-1 through 900-$x$ are returned as results of an executed search. Using the probability model, respective probability estimates 910-1 through 910-$x$ are determined for the specialized results. Probability estimates 910-1 through 910-$x$ may be used in selecting which of specialized results 900-1 through 900-$x$ will be supplied to the user. As shown in FIG. 9, specialized results 900-1 through 900-3 are selected 920 as being associated with the highest probability estimates.

Figure 10:
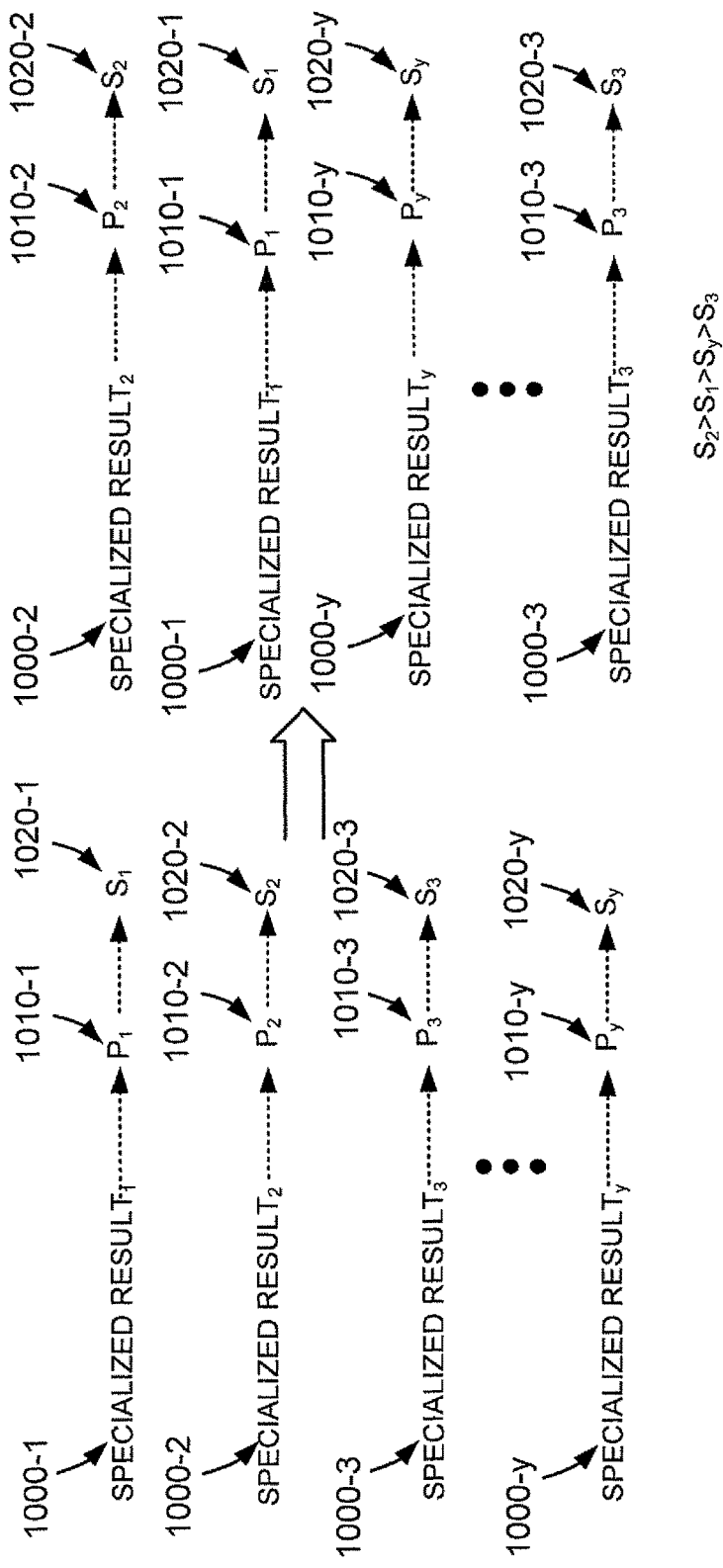
FIG. 10 is a diagram that graphically depicts the scoring and ranking of search results using probability estimates obtained via the exemplary process of FIG. 7.

FIG. 10 illustrates another exemplary embodiment in which specialized results 1000-1 through 1000-$y$ are returned as results of an executed search. Using the probability model, respective probability estimates 1010-1 through 1010-$y$ are determined for the specialized results. A score 1020-1 through 1020-$y$ may be assigned to each of specialized results 1000-1 through 1000-$x$ based on a respective one of probability estimates 1010-1 through 1010-$y$. As further shown in FIG. 10 specialized results 1000-1 through 1000-$y$ may be re-ordered in rank order based on their respect scores 1020-1 through 1020-$y$. As shown in FIG. 10, $S_2 > S_1 > S_y > S_3$, and, therefore, specialized results are ranked in the order specialized result$_2$, specialized result$_1$, specialized result$_y$, and specialized result$_3$.

Figure 11:
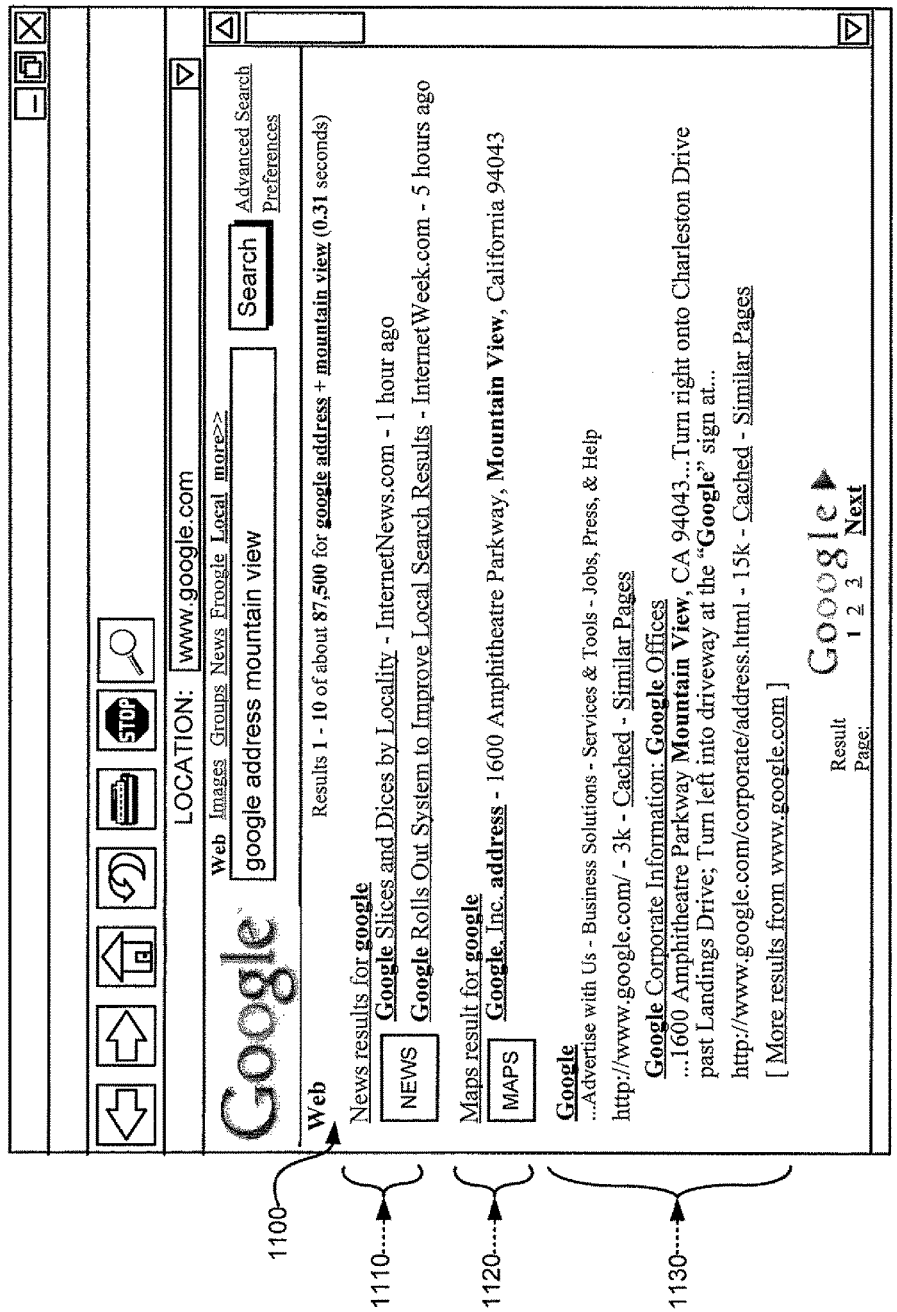
FIG. 11 is a diagram of an exemplary search results document.

Specialized results from the set of specialized results may be provided in a highlighted location or a prominent position with respect to the search results (block 750). The specialized results selected in block 740 may be provided to the user along with the set of search results, as depicted in search result document 840 of FIG. 8. FIG. 11 depicts details of an exemplary search result document 1100 that includes specialized results 1110 and 1120 located at a prominent position (e.g., at the top of search result document 1100) and search results 1130. As shown in FIG. 11, specialized result 1110 includes "news" results and specialized result 1120 includes a "map" result. Alternatively, a number of the top scoring specialized results, as scored in block 740 of FIG. 7, may be provided to the user with the set of search results. As another alternative, the scored specialized results may be provided in a rank order corresponding to the specialized results' scores, highest to lowest.

Parameters associated with the user's selection of specialized results from the provided specialized results may also be tracked (not shown in FIG. 7) and may, using statistical techniques, be used to adjust, or completely re-train or re-model, the probability model built in block 450 above.

CONCLUSION

Implementations described herein provide illustration and description, but is not intended to be exhaustive or to limit the invention to the precise form disclosed. Modifications and variations are possible in light of the above teachings, or may be acquired from practice of the invention. For example, while series of acts have been described with regard to FIGS. 4 and 7, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method performed by one or more server devices, the method comprising:
    constructing, by one or more processors of the one or more server devices, a probability model, from information regarding computer based search result interactions of a user, to estimate a probability that the user will select a certain type of specialized search result, wherein constructing the probability model from information regarding the computer based search result interactions of the user comprises constructing the probability model based on a quantity of past selections by the user of search results that are members of the certain type of specialized search result;
    searching, by one or more processors of the one or more server devices, sources of information based on a search query received from the user to determine a set of search results;
    using, by one or more processors of the one or more server devices, the estimated probability to select, from the set of search results, one or more search results that are of the certain type; and
    outputting, by one or more processors of the one or more server devices and in response to the search query, the selected one or more search results for presentation to a user via a computing device of the user, wherein outputting the selected one or more search results for presentation to the user comprises:
        outputting other search results that are of the set of search results but not of the certain type, and
        outputting the selected one or more search results for display to the user in a visually distinct manner relative to the other search results.

2. The method of claim 1, wherein each of the sources of information includes information related to one of news, stock quotes, weather, music, movies, travel, maps, images, shopping, search history, definitions, questions, patents, or a local time.

3. The method of claim 1, wherein the estimated probability includes at least one of:
    a probability that the user will select news results;
    a probability that the user will select stock quote results;
    a probability that the user will select weather results;
    a probability that the user will select music results;
    a probability that the user will select movie results;
    a probability that the user will select travel results;
    a probability that the user will select map results;
    a probability that the user will select image results;
    a probability that the user will select shopping results;
    a probability that the user will select search history results;
    a probability that the user will select word definition results;
    a probability that the user will select patent results; or
    a probability that the user will select local time results.

4. The method of claim 1, wherein outputting the selected one or more search results for display to the user in a visually distinct manner relative to the other search results comprises outputting the selected one or more search results highlighted or featured prominently relative to the other search results.

5. The method of claim 1, wherein outputting the selected one or more search results for display to the user in a visually distinct manner relative to the other search results comprises outputting the selected one or more search results and an identifier of the certain type for presentation in conjunction with one another.

6. A computer-implemented system, comprising:
    one or more processors to:
    construct a probability model, from information regarding computer based search result interactions of a user, to estimate a probability that the user will select a certain type of specialized search result, wherein the one or more processors, in constructing the probability model from information regarding the computer based search result interactions of the user, are to construct the probability model based on a quantity of past selections by the user of search results that are members of the certain type of specialized search result;
    search sources of information based on a search query received from the user to determine a set of search results;
    use the estimated probability to select, from the set of search results, one or more search results that are of the certain type; and
    output, in response to the search query, the selected one or more search results for presentation to a user via a computing device of the user, wherein the one or more processors in outputting the selected one or more search results for presentation to the user are to:
    output other search results that are of the set of search results but not of the certain type, and
    output the selected one or more search results for display to the user in a visually distinct manner relative to the other search results.

7. The computer-implemented system of claim 6, wherein each of the sources of information includes information related to one of news, stock quotes, weather, music, movies, travel, maps, images, shopping, search history, definitions, questions, patents, or a local time.

8. The computer-implemented system of claim 6, wherein the estimated probability includes at least one of:
    a probability that the user will select news results;
    a probability that the user will select stock quote results;
    a probability that the user will select weather results;

a probability that the user will select music results;
a probability that the user will select movie results;
a probability that the user will select travel results;
a probability that the user will select map results;
a probability that the user will select image results;
a probability that the user will select shopping results;
a probability that the user will select search history results;
a probability that the user will select word definition results;
a probability that the user will select patent results; or
a probability that the user will select local time results.

9. The computer-implemented system of claim 6, wherein the one or more processors in outputting the selected one or more search results for display to the user in a visually distinct manner relative to the other search results are to output the selected one or more search results highlighted or featured prominently relative to the other search results.

10. The computer-implemented system of claim 6, wherein the one or more processors in outputting the selected one or more search results for display to the user in a visually distinct manner relative to the other search results are to output the selected one or more search results and an identifier of the certain type for presentation in conjunction with one another.

11. One or more non-transitory computer readable storage media storing computer instructions executable by a processor, the instructions including instructions to:
construct a probability model, from information regarding computer based search result interactions of a user, to estimate a probability that the user will select a certain type of specialized search result, wherein the instructions to construct the probability model from information regarding the computer based search result interactions of the user include instructions to construct the probability model based on a quantity of past selections by the user of search results that are members of the certain type of specialized search result;
search sources of information based on a search query received from the user to determine a set of search results;
use the estimated probability to select, from the set of search results, one or more search results that are of the certain type; and
output, in response to the search query, the selected one or more search results for presentation to a user via a computing device of the user, wherein the instructions to output the selected one or more search results for presentation to the user comprise instructions to:
output other search results that are of the set of search results but not of the certain type, and
output the selected one or more search results for display to the user in a visually distinct manner relative to the other search results.

12. The one or more non-transitory computer readable storage media of claim 11, wherein each of the sources of information includes information related to one of news, stock quotes, weather, music, movies, travel, maps, images, shopping, search history, definitions, questions, patents, or a local time.

13. The one or more non-transitory computer readable storage media of claim 11, wherein the estimated probability includes at least one of:
a probability that the user will select news results;
a probability that the user will select stock quote results;
a probability that the user will select weather results;
a probability that the user will select music results;
a probability that the user will select movie results;
a probability that the user will select travel results;
a probability that the user will select map results;
a probability that the user will select image results;
a probability that the user will select shopping results;
a probability that the user will select search history results;
a probability that the user will select word definition results;
a probability that the user will select patent results; or
a probability that the user will select local time results.

14. The one or more non-transitory computer readable storage media of claim 11, wherein the instructions to output the selected one or more search results for display to the user in a visually distinct manner relative to the other search results include instructions to output the selected one or more search results highlighted or featured prominently relative to the other search results.

* * * * *